June 22, 1965 G. F. SAVONUZZI 3,190,351
REGENERATOR SEAL
Filed July 3, 1961 2 Sheets-Sheet 1

INVENTOR.
Giovanni F. Savonuzzi
BY Harness & Harris
ATTORNEYS.

June 22, 1965    G. F. SAVONUZZI    3,190,351
REGENERATOR SEAL
Filed July 3, 1961    2 Sheets-Sheet 2
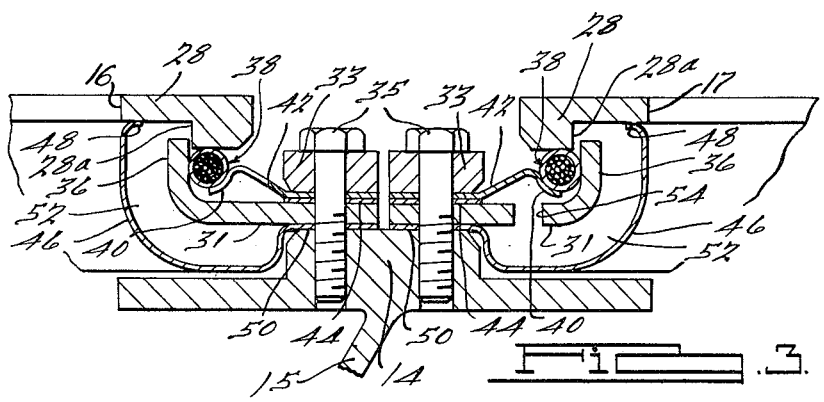
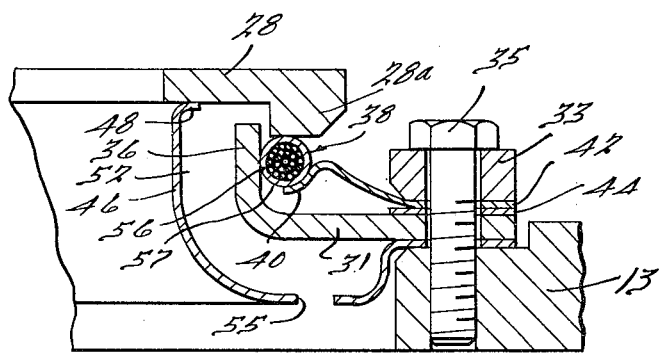
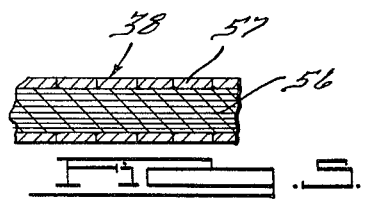
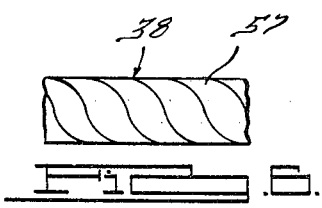
INVENTOR.
Giovanni F. Savonuzzi
BY
Harness & Harris
ATTORNEYS.

3,190,351
REGENERATOR SEAL
Giovanni F. Savonuzzi, Birmingham, Mich., assignor to Chrysler Corporation, Highland Park, Mich., a corporation of Delaware
Filed July 3, 1961, Ser. No. 121,397
8 Claims. (Cl. 165—9)

This invention relates to the sealing of the gas flow passages leading to and from the regenerator of a gas turbine engine.

In a conventional type of gas turbine engine, the inlet and exhaust motive gases for the turbine rotors are directed by suitable inlet and exhaust conduits respectively to separate sectors of a rotatable regenerator disc. The latter comprises a matrix of small gas passages extending parallel to the axis of rotation, such that heat from the exhaust gases is absorbed by the regenerator matrix and thereafter transferred to the inlet gases as the matrix progressively rotates from the exhaust conduit to the inlet conduit. Because of extreme and constantly varying temperatures to which the regenerator matrix is subjected, warping of the regenerator has rendered difficult the provision of fluid tight seals at the junctures of the matrix with the inlet and exhaust conduits.

An object of the present invention is to provide an improved flexible seal capable of withstanding the temperature extremes involved in a gas turbine engine and of conforming readily to the juncture to be sealed during thermal and pressure induced deformation of the parts at the juncture.

Another object is to provide improved sealing means for use with a rotatable regenerator of a gas turbine engine wherein the sealing means includes a sector plate capable of supporting the regenerator in sliding and sealing engagement therewith and also includes an improved support for the sector plate, the support and sector plate having interfitting locating flanges arranged to maintain the sector plate in predetermined alignment with respect to the support, and the latter being secured to a fixed frame or housing portion of the engine. The crack or space between the locating flanges is closed by a flexible linear sealing element extending along the length of the seal and engaging both locating flanges at the high pressure and low temperature side of the seal. The sealing element is held in sealing position by said high pressure and also by a plurality of spring fingers secured to the support.

Another object is to provide such a seal including simply constructed and assembled baffle means secured to the support and spaced from the seal at the high temperature and low pressure side thereof to provide a gas passage for the flow of a gaseous coolant to shield the sealing element from the direct influence of the high temperature gases flowing through the regenerator matrix.

Still another object is to provide an improved sealing element of the above character which is of circular cross section and is thus capable of twisting about its longitudinal axis without affecting the angle of its surface contact with said locating flanges.

Such a sealing element can comprise a steel wire, or a cord of ceramic or rubber-like material capable of withstanding the temperature extremes involved. The use of a flexible cord of heat resistant ceramic fibers is desirable because of the thermal properties of such a cord. However, difficulty has been experienced in maintaining such a cord sufficiently compact to prevent leakage of gases therethrough. It is accordingly another object of the invention to provide an improved ceramic fiber sealing element comprising a cord of such fibers tightly bound and compacted within a flexible spiral metallic sheath, thereby to preserve and enhance the advantages of the ceramic type seal while retaining the necessary flixibility to enable the seal to conform to dimensional changes in the regenerator and sealing structure.

Other objects of this invention will appear in the following description and appended claims, reference being had to the accompanying drawings forming a part of the specification wherein like reference characters designate corresponding parts in the several views.

FIGURE 3 is an enlarged sectional view taken in the direction of the arrows generally along the broken line 3—3 of FIGURE 2.

FIGURE 4 is en enlarged sectional view taken in the direction of the arrows substantially along the line 4—4 of FIGURE 2.

FIGURE 5 is a fragmentary mid sectional view through the sealing element, taken longitudinally thereof.

FIGURE 6 is an elevational view of the sealing element of FIGURE 5.

Figure 1:
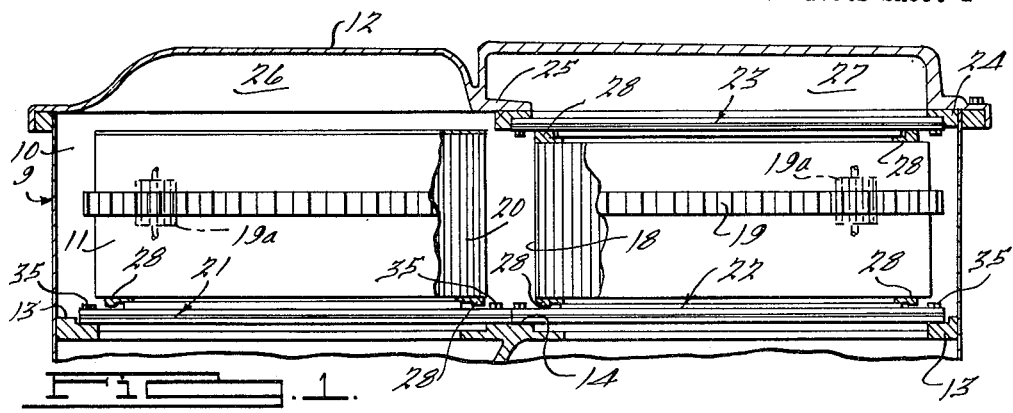
FIGURE 1 is a vertical mid sectional view through a gas turbine regenerator and seal embodying the present invention.
Figure 2:
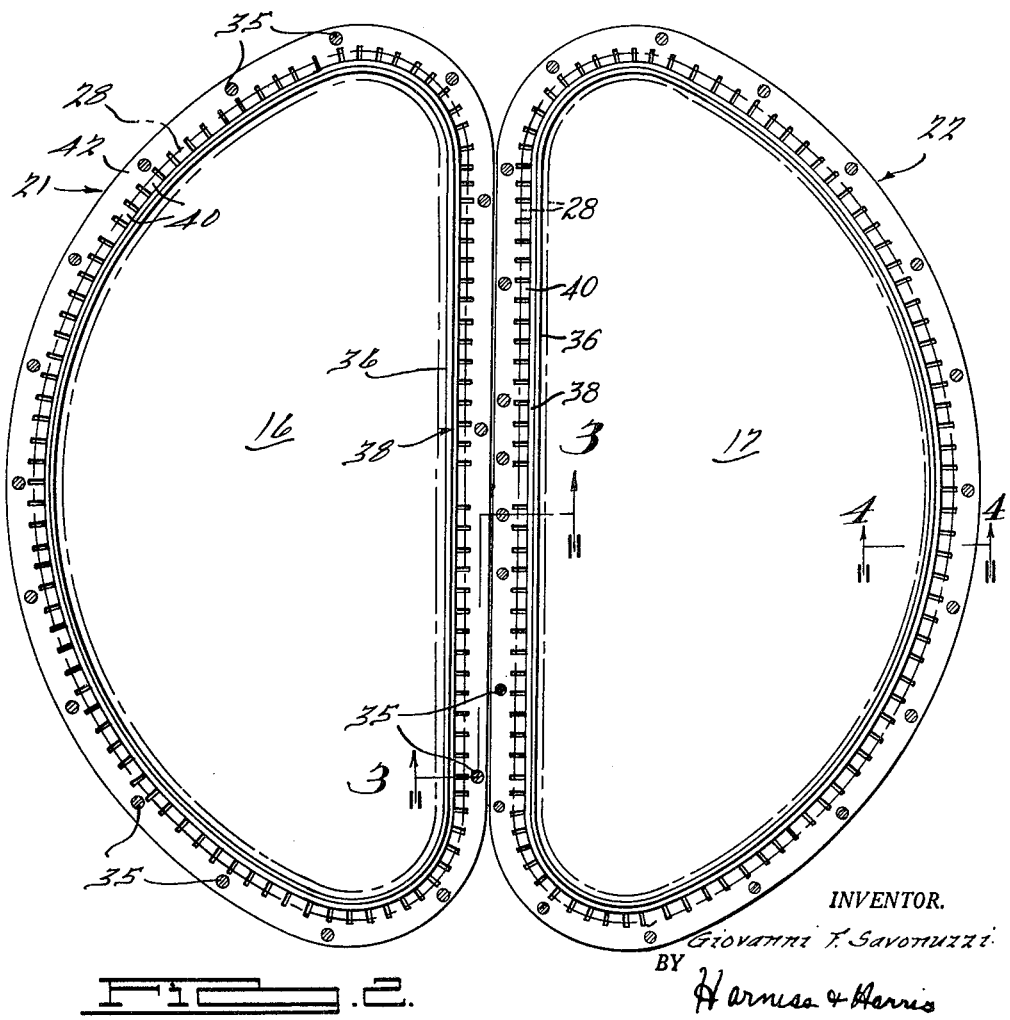
FIGURE 2 is an enlarged elevational view of the seal illustrated in FIGURE 1, with the sector plate removed.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the present invention is illustrated by way of example in application with a gas turbine engine comprising a frame or housing 9 formed to provide a cylindrical chamber 10 for a rotatable regenerator 11. The chamber 10 is closed by a suitable cover 12.

The base of the chamber 10 is defined by a platform 13 comprising an annular part secured to the inner cylindrical wall of the chamber 10 and partitioned into two separate sector areas 16 and 17 by a diametrically extending cross arm 14 supported by a bulkhead 15 which separates the inlet and exhaust gases flowing through the regenerator as described below.

The regenerator 11 is formed with a central hub 18 and is suitably supported within the chamber 10 for rotation about the axis of the hub 18 which extends perpendicularly to the plane of the platform 13. Secured to the outer periphery of the regenerator 11 is a ring gear 19 which is suitably driven by a pinion gear, not shown, operably connected with one of the turbine rotors. The regenerator 11 is maintained in centered position with respect to the platform 13 by means of a plurality of idler gears 19a suitably supported by the housing 9 so as to mesh with gear 19. The body of the regenerator comprises a matrix 20 of a multitude of axially extending gas flow passages arranged to conduct inlet and exhaust gases axially through separate sectors of the regenerator overlying the sectors 16 and 17.

The weight of the regenerator 11 is supported by seals 21 and 22 comprising closed loops extending completely around the sectors 16 and 17 respectively. Above the regenerator 11 is an upper seal 23 which is a mirror image of seal 22. The seal 23 is confined between the regenerator 11 and an upper substantially semi-circular backup plate 24 enclosing an area substantially coextensive with the sector 17 and suitably secured to the housing 10. The central portion of plate 24 is supported by a diametrically extending reinforcing web 25 which partitions the area under cover 24 into an inlet dome 26 for comparatively cool high pressure gases and an exhaust dome 27 for comparatively hot low pressure exhaust gases. In accordance with the structure described, combustion supporting inlet air is supplied to dome 26 and the annular space of chamber 10 around regenerator 11 so as to bathe the latter and the driving ring gear 19 in a comparatively cool fluid medium. From dome 26, the inlet gases pass axially downward through the sector of the regenerator 11 overlying sector area 16. Fuel is then adedd to these gases and burned and the combustion products are employed to drive the gas turbine rotors in accordance with customary practice. The exhaust gases are then conveyed to the underside of the regenerator 11 below the sector 17, thence axially upward through the regenerator matrix into the exhaust dome 27, the latter being connected to atmosphere.

During the downward passage of the inlet gases through the sector 16, these gases absorb heat from the regenerator and also suffer a pressure loss in consequence of the resistance to flow afforded by the regenerator matrix. Accordingly, the gases immediately below the regenerator 11 in the region of the sector 16 are at a pressure somewhat below and at a temperature appreciably above the pressure and temperature of the inlet gases in the chamber 10 surrounding the regenerator 11. The exhaust gases below the regenerator 11 at the region of the sector 17 will be at an appreciably reduced presure with respect to the pressure of the gases that have passed through the regenerator matrix at the region of the sector 16. However, these exhaust gases are still at high temperature and are thus employed to heat the regenerator matrix during their upward flow therethrough into the exhaust dome 27. In order to maintain the above described flow path, the seals 21 and 22 are designed as described below to prevent flow of the inlet gases into the sectors 16 and 17 from the surrounding portions of the chamber 10. Similarly, the seal 23 is designed to prevent flow of the gases from chamber 10 into the area of the exhaust dome 27.

Referring more particularly to FIGURES 3–6, each of seals 21 and 22 comprises a semi-circular sector plate or sealing member 28 which extends entirely around the associated sector opening 16 or 17 for passage of the gases therethrough. The seals 21 and 22 are mirror images of each other, so that only one of these seals is described, the corresponding parts of both seals being numbered the same. The upper surfaces of the sector plates 28 for the lower seals 21 and 22 are in sliding and sealing engagement with the underside of the regenerator matrix 20 around the sectors 16 and 17 respectively, whereas the underside of the sector plate 28 for the upper seal 23 is in sliding and sealing contact with the upper surface of the regenerator matrix 20 around the area coextensive with the sector 17. Extending axially away from the regenerator 11 around the outer peripheral edge of each of the sector plates 28 is a locating flange 28a. Associated with each sector plate 28 is a semi-circular support 31 suitably secured to platform portions 13 and 14 by means of a semi-circular clamping ring 33 and bolts 35. Each support 31 extends into the associated sector area 16 or 17 and terminates in a semi-circular locating flange 36 which extends entirely around the associated area 16 or 17 in juxtaposition with the inner edge of the associated locating flange 28a. Thus each sector plate 28 is maintained in a desired fixed alignment with respect to its support 31 and flange 36 without being positively secured thereto.

In order to seal the crack or space between the flanges 28a and 36, a semi-circular sealing element 38 extends around the high pressure side of each of the seals 21, 22 and 23 in sealing engagement with the flanges 28a and 36 as illustrated, FIGURES 3 and 4. Each sealing element 38 is constructed with a circular cross section so as to present a uniform sealing surface in contact with the flanges 28a and 36 regardless of torsion of the element 38 about its longitudinal axis. Likewise, each element 38 is sufficiently flexible so as to conform to the locating flanges regardless of pressure and thermally induced warping of the regenerator. The elements 38 may comprise a wire of steel or other alloy, a rubber- like or ceramic material capable of withstanding the temperatures involved. In order to maintain each sealing element 38 in sealing contact with its associated locating flanges 28a and 36, the element 38 is yieldingly urged against the latter flanges by a plurality of spring fingers 40 spaced along the length of the element 38 and extending from an integral resilient sector sheet 42 extending entirely around the associated sector area 16 or 17 and clamped between ring 33 and support 31. Where desired, a suitable washer 44 coextensive with the sheet 42 is clamped between the later and associated support 31.

At the low pressure side of each seal and also extending entirely around the associated sector area 16 or 17 is a baffle 46 which terminates in an inbent flange 48 in sliding contact with the outer surface of the associated sector plate remote from the regenerator 11. Adjacent the platform portions 13 and 14, each baffle 46 curves toward the associated support 31 and terminates in a flange 50 clamped between the support and platform portions by the bolts 35. As illustrated, each baffle 46 is spaced sufficiently from its associated support 31 to provide a semi-circular coolant duct 52 extending entirely around the associated sector area 16 or 17. The comparatively cool high pressure inlet gases from dome 26 enter the central hub 18 and then flow into the coolant passages 52 via inlet ports 54 formed in each of the supports 31 adjacent the region of the hub 18. The cooling gases then flow in opposite directions within each passage 52 and are discharged via exhaust ports 55 in the associated baffle 46 as locations approximately diametrically opposite from the inlet ports 54, FIGURES 3 and 4.

Referring to FIGURES 5 and 6, a sealing element 38 comprising a cord 56 of ceramic fibers is preferred because of the latter's flexibility and thermal properties. In order to render such a cord 56 feasible, and to compact the same sufficiently to prevent leakage of gases therethrough, the cord is wound tightly within a spiral metallic temperature resistant sheath 57 so as to render the compact fibers of the cord 56 impervious to flow of gases therebetween and to present an unbroken flexible sealing surface engageable with the locating flanges 28a and 36 in fluid sealing contact.

I claim:

1. In a gas turbine engine, a rotatable regenerator having means for passage of gases therethrough, a gas passage conduit in communication with said regenerator, a fixed sector plate having an opening therethrough defining a portion of said conduit, said sector plate also having an inner side in sliding and sealing engagement with the rotating surface of said regenerator entirely around said opening, a fixed support defining a portion of said conduit and extending entirely around said opening, said support having a side extending angularly to and in proximity to an outer side of said sector plate opposite said inner side, a sealing element of circular cross section extending entirely around said opening in sealing engagement with both the side of said support and the outer side of said sector plate to effect a sealed juncture therebetween, and resilient means urging said sealing element obliquely against the latter two sides into said sealing engagement therewith.

2. In a gas turbine engine, a rotatable regenerator having means for passage of gases therethrough, a gas passage conduit in communication with said regenerator, a fixed sector plate having an opening therethrough defining a portion of said conduit, said sector plate also having an inner side in sliding and sealing engagement with the rotating surface of said regenerator entirely around said opening, a fixed support defining a portion of said conduit and extending entirely around said opening in proximity to an outer side of said sector plate opposite said inner side, the periphery of said sector plate having a locating flange extending outwardly from said regenerator, said support having a locating flange extending inwardly toward said regenerator and interfitting with the first named flange, said flanges extending entirely around said opening and being effective to locate said sector plate in predetermined relationship with respect to said conduit, a sealing element of circular cross section extending entirely around said opening in sealing engagement with both said support and outer side of said sector plate to effect a sealed juncture therebetween, said sealing element engaging the outer edge of the sector plate flange and a juxtaposed edge of the support flange extending angularly to said outer edge, and resilient means urging said sealing element obliquly against the latter two edges into said sealing engagement.

3. In the combination according to claim 2, said resilient means comprising a plurality of separate fingers secured to said support around said periphery and extending toward and engaging said sealing element under tension at a plurality of locations spaced along its length.

4. In a gas turbine engine, a supporting frame, a regenerator rotatably mounted on said supporting frame and having means for passage of comparatively high and low pressure gases therethrough, partitioning means carried by said frame for separating said high pressure and low pressure gases including a fixed sealing member extending along the demarcation between said high and low pressure gases in sliding and sealing engagement with a rotating surface of said regenerator, a support comprising part of said partitioning means and having a flange extending toward said regenerator and terminating along said demarcation adjacent said member, a sealing element extending along said demarcation in sealing engagement with the side of said member opposite said regenerator and also with said flange to effect a sealed juncture between said flange and member, said sealing element engaging said flange and member at the high pressure side of said juncture to be urged into said sealing engagement by said high pressure gases, resilient means urging said sealing element into said sealing engagemnet, baffle means spaced from the low pressure side of said support and extending along said demarcation, said baffle means being secured to said frame and resiliently engaging said sealing member to effect a coolant duct extending along said demarcation in the space between said support and baffle means, and means for circulating coolant gases in said coolant duct.

5. In a gas turbine engine, a supporting frame, a regenerator rotatably mounted on said supporting frame and having means for passage of comparatively high and low pressure gases therethough, partitioning means carried by said frame for separating said high pressure and low pressure gases including a fixed sealing member extending along the demarcation between said high and low pressure gases in sliding and sealing engagement with a rotating surface of said regenerator, a support comprising part of said partitioning means and having a flange extending toward said regenerator transversely to the side of said element opposite said regenerator and terminating along said demarcation adjacent said member, a sealing element of circular cross section extending along said demarcation in sealing engagement with said side and also with said flange to effect a sealed juncture between said flange and member, said sealing element engaging said flange and member at the high pressure side of said juncture to be urged into said sealing engagement by said high pressure gases, resilient means urging said sealing element into said sealing engagement, baffle means spaced from the low pressure side of said support and extending along said demarcation, said baffle means being secured to said frame and resiliently engaging said sealing member to effect a coolant duct extending along said demarcation in the space between said support and baffle means, and means for circulating coolant gases in said coolant duct.

6. In a gas turbine engine, a supporting frame, a regenerator rotatably mounted on said supporting frame and having means for passage of comparatively high and low pressure gases therethough, partitioning means carried by said frame for separating said high pressure and low pressure gases including a fixed sealing member extending along the demarcation between said high and low pressure gases in sliding and sealing engagement with a rotating surface of said regenerator, a support comprising part of said partitioning means and terminating along said demarcation adjacent said member at an angle thereto, means for effecting a seal between said support and member and adapted to twist about its longitudinal axis without affecting said seal comprising a flexible sealing element of circular cross section extending along said demarcation in the angle between said support and member and in sealing engagement therewith.

7. In a gas turbine engine, a supporting frame, a regenerator rotatably mounted on said supporting frame and having means for passage of comparatively high and low pressure gases therethrough, partitioning means carried by said frame for separating said high pressure and low pressure gases including a fixed sealing member extending along the demarcation between said high and low pressure gases in sliding and sealing engagement with a rotating surface of said regenerator, a support comprising part of said partitioning means and terminating along said demarcation adjacent said member at an angle thereto, means for effecting a seal between said support and member and adapted to twist about its longitudinal axis without affecting said seal comprising a flexible metallic wire of circular cross section extending along said demarcation in the angle between said support and member and in sealing engagement therewith.

8. In a gas turbine engine, a supporting frame, a regenerator rotatably mounted on said supporting frame and having means for passage of comparatively high and low pressure gases therethough, partitioning means carried by said frame for separating said high pressure and low pressure gases including a fixed sealing member extending along the demarcation between said high and low pressure gases in sliding and sealing engagement with a rotating surface of said regenerator, a support comprising part of said partitioning means and terminating along said demarcation adjacent said member at an angle thereto, means for effecting a seal between said support and member and adapted to twist about its longitudinal axis without affecting said seal comprising a plurality of flexible ceramic fibers extending longitudinally of said demarcation in the angle between said support and member, and also comprising a thin flexible strip tightly wound spirally around said fibers to sheath and compact the latter into a ceramic core impervious to the flow of said gases therethough and to complete a flexible sealing element of circular cross section, and means for urging said sealing element into said angle in sealing engagement with said support and member.

References Cited by the Examiner

UNITED STATES PATENTS

| | | | |
|---|---|---|---|
| 2,859,061 | 11/58 | Reid | 277—228 |
| 2,906,552 | 9/59 | White | 277—228 |
| 3,016,231 | 1/62 | Muller | 165—9 |
| 3,022,051 | 2/62 | Gibson | 165—9 |
| 3,108,632 | 10/63 | Jensen et al. | 165—9 |

FOREIGN PATENTS 768,854   2/57   Great Britain.

CHARLES SUKALO, *Primary Examiner.*

WALTER A. SCHELL, *Examiner.*